United States Patent [19]

Cosenza et al.

[11] Patent Number: 4,645,398
[45] Date of Patent: Feb. 24, 1987

[54] TANGLESS HELICALLY COILED INSERT

[75] Inventors: Frank J. Cosenza, Rolling Hills; Albert K. Yamamoto, Huntington Beach, both of Calif.

[73] Assignee: Rexnord Inc., Brookfield, Wis.

[21] Appl. No.: 814,867

[22] Filed: Dec. 30, 1985

Related U.S. Application Data

[63] Continuation-in-part of Ser. No. 533,845, Sep. 15, 1983, abandoned.

[51] Int. Cl.$^4$ ............................................. F16B 37/12
[52] U.S. Cl. ..................................... 411/438; 10/1 A
[58] Field of Search .............. 411/178, 250, 251, 252, 411/438, 929.1, 17, 18, 19; 10/1 A, 74, 86 R

[56] References Cited

U.S. PATENT DOCUMENTS

| | | |
|---|---|---|
| 1,966,520 | 7/1934 | Rayner . |
| 2,363,789 | 11/1944 | Haas . |
| 2,371,674 | 3/1945 | Caminez . |
| 2,586,007 | 2/1952 | Cram et al. . |
| 2,724,297 | 11/1955 | Mercer . |
| 2,755,699 | 7/1956 | Forster . |
| 3,272,250 | 9/1966 | Hattan . |
| 4,563,119 | 1/1986 | Cosenza ............................. 411/438 |

FOREIGN PATENT DOCUMENTS

| | | |
|---|---|---|
| 238073 | 4/1960 | Australia . |
| A1090698 | 10/1983 | European Pat. Off. . |
| B376285 | 10/1984 | Fed. Rep. of Germany . |
| A559320 | 2/1975 | Switzerland . |

Primary Examiner—Alfred C. Perham

[57] ABSTRACT

A helically coiled wire-type screw thread insert, of the type used for tapped holes in workpieces in which a fastener component is threaded into, is provided. The two free end coils (12) each have a hook means recess (14) on the inner screw thread of each, and the terminal end (16) of each free end coil (12) has a reduced transverse cross-section or a diminishing cross-sectional area construction. Further the outer thread pitch diameter (P1) of the free end coils (12A, 12B) is preferably less than that of the remaining coils (13′). The invention provides improved insertion capability and provides a removal capability unknown in the screw thread inserts of the prior art.

2 Claims, 13 Drawing Figures

U.S. Patent  Feb. 24, 1987  Sheet 1 of 2  4,645,398
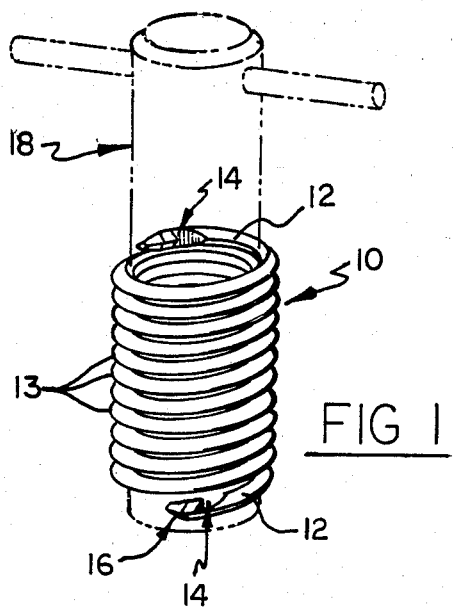
FIG 1
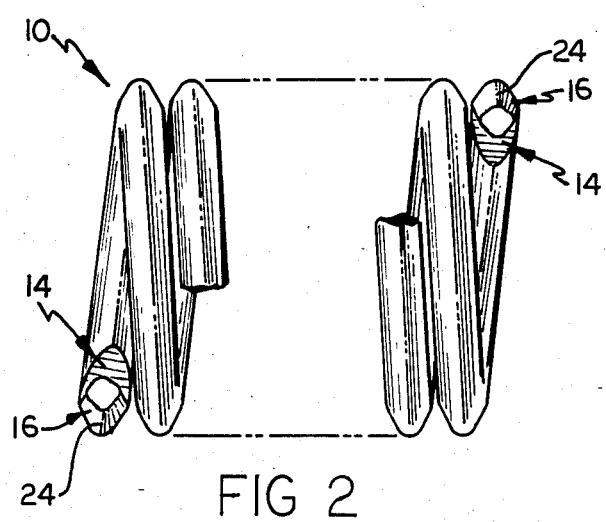
FIG 2
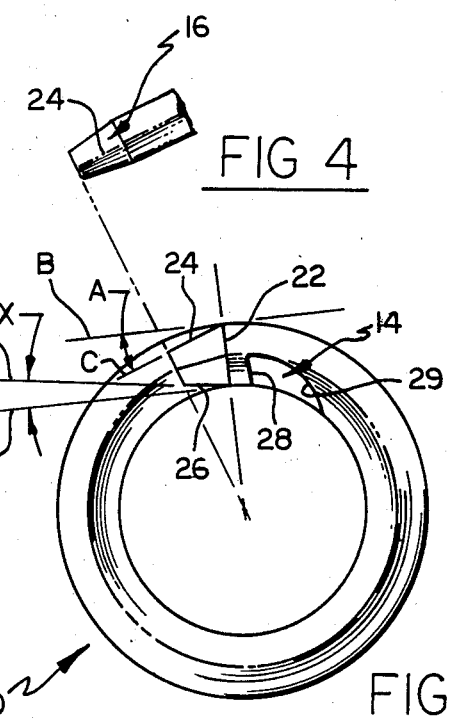
FIG 4
FIG 3
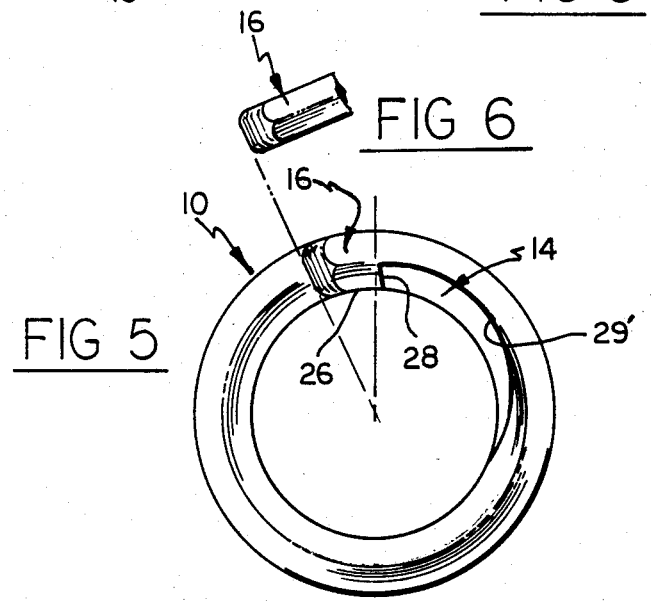
FIG 6
FIG 5

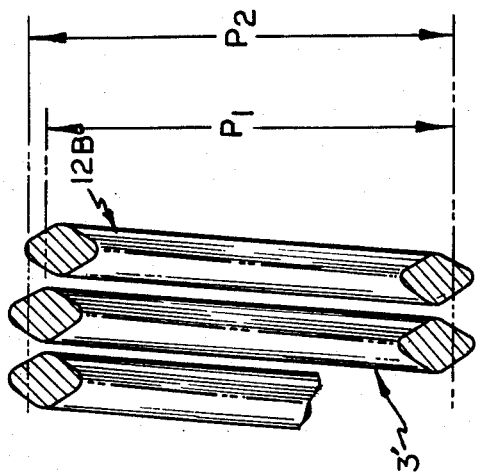
FIG 9
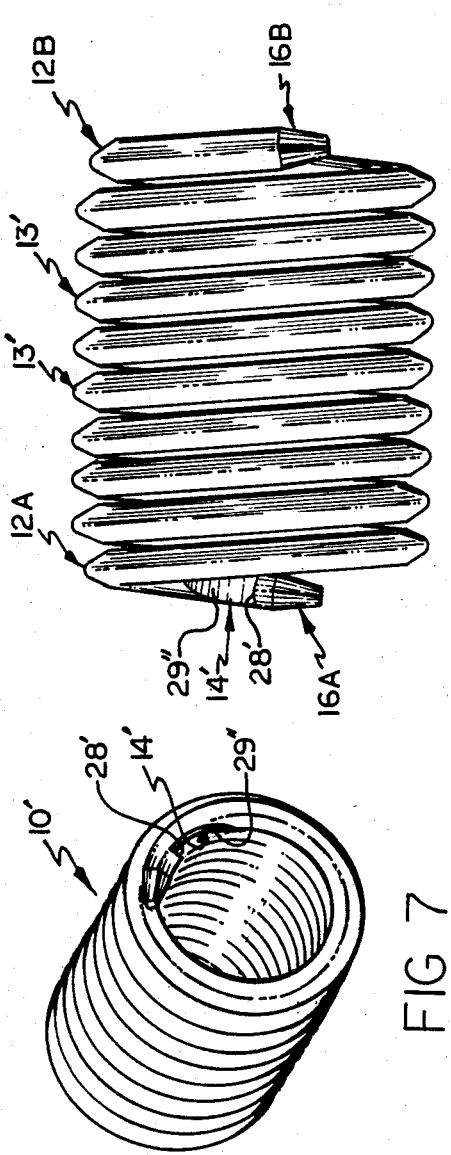
FIG 8
FIG 7
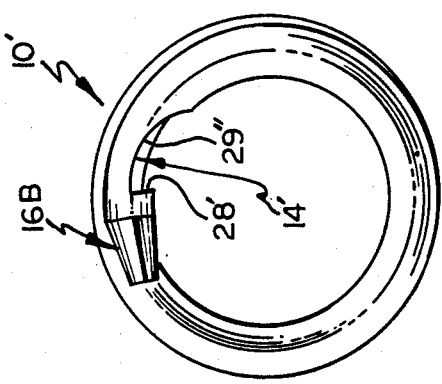
FIG 13
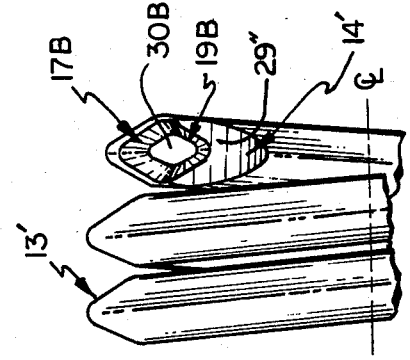
FIG 12
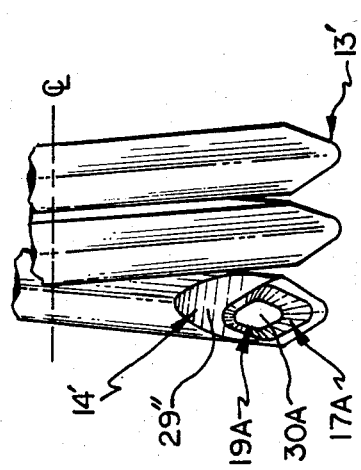
FIG 11
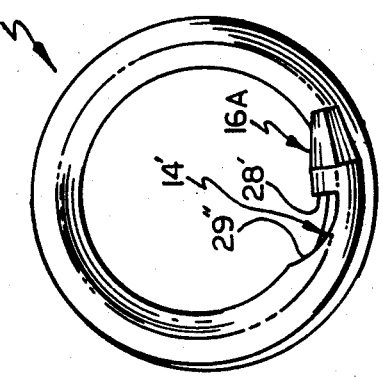
FIG 10

TANGLESS HELICALLY COILED INSERT

This application is a continuation in-part-of application Ser. No. 533,845 filed Sept. 16, 1983 now abandoned.

TECHNICAL FIELD

The invention relates to helically coiled, wire-type screw thread inserts for tapped holes of workpieces and, more particularly to tangless helically coiled wire-type screw thread inserts.

BACKGROUND OF THE INVENTION

The conventional helically coiled, wire-type screw thread insert currently available to the industry is provided with a diametrical tang on one of its end convolutions. The tang is constructed so as to be gripped by a special tool projecting through the insert. This then enables insertion of the insert into a tapped hole. After the insertion of the insert the tang must be broken off and removed, otherwise the tang would prevent a bolt from being threaded into the insert. Accordingly, a notch is provided on the inside of the end convolution of the coil near the tang so that the tang may be broken off. The broken tang must be accounted for in certain critical applications, e.g. in electronic equipment in which the loose metal tang could cause an electrical short, also in internal combustion engines where the loose metal tang could cause engine failure. Further, the extraction of such prior art inserts once installed, requires the use of an extracting tool which essentially destroys and thus prevents any reuse of the insert. The removal process can also cause damage to the workpiece.

Tangless helically coiled, wire-type inserts are known and an example of such is described in U.S. Pat. No. 2,363,789 which issued to O. Haas, Nov. 28, 1944. Such an insert, however would require that the end coil, containing the recessed hook, project inwardly in order to avoid causing burrs or shaving the material from the tapped thread in the workpiece hole during the installation of the insert. Any build-up of burrs and shaved material can prevent insert installation or lead to improper installation and an inability to install a bolt therein. The extraction of the Haas-type tangless insert, not designed for ease of removal, requires the use of an extracting tool, which also essentially destroys and prevents reuse of the insert, as well as, causing possible damage to the workpiece.

A problem with both the conventional tang inserts and the Haas tangless insert is that the method used for inserting the insert into a tapped hole requires the operator to manually orient the driving end of the insert. This is necessary before any installation torque can be applied to the driving end of the coiled insert, because the tang or recessed hook is only at one end of such prior art inserts. Despite such prior art inserts, there exists a need in the industry for a helically coiled, wire-type screw thread insert which (1) can be inserted into the workpiece by either end without regard to orientation, (2) does not cause damage to the workpiece during installation as by shaving or similar action, (3) provides a lead-in or piloting action for the bolt insertion, (4) can be subsequently removed without damage to either the insert or the workpiece and, (5) does not require accounting for broken-off tang portions.

SUMMARY OF THE INVENTION

The present invention is directed to a tangless helically coiled, wire-type screw thread insert for use in a tapped hole. Among the features of the present invention are the following:

First, the invention is tangless at both ends and thus either end may be gripped for installing the insert in a tapped hole. There is no particular need to orient the invention in the manner required by the prior art inserts.

Secondly, the invention is configured so that it will not cause any damage to the workpiece during its installation. This is accomplished primarily by a unique terminal end portion configuration to be described in greater detail in the detailed description which follows.

Thirdly, the invention provides a unique capability not known in the prior art, namely a lead-in or piloting function for insertion of a fastener component, e.g. a bolt.

Fourthly, the insert of the present invention may be removed, if need be, without being damaged and without causing damage to the workpiece.

Finally, because it is tangless there is no time-consuming, expensive, frustrating efforts required by the prior art for accounting for broken-off tang portions.

These and other features of the invention will be appreciated more completely after a reading of the detailed description which follows.

BRIEF DESCRIPTION OF THE DRAWINGS

In the accompanying drawings, forming a part of this specification, and in which reference numerals shown in the drawings designate like or corresponding parts throughout the same, FIG. 1 is a perspective view of a tangless helically coiled, wire-type screw thread insert of the present invention;

FIG. 2 is a side elevation of the insert of FIG. 1;

FIG. 3 is a front elevation view of the insert of FIG. 2;

FIG. 4 is an plan view of either free end of the present invention;

FIG. 5 is a front elevation of another embodiment of the present invention;

FIG. 6 is an plan view of either free end of the embodiment of FIG. 5.

FIG. 7 is a view in perspective of a preferred embodiment of the present invention.

FIG. 8 is a side elevational view of the embodiment shown in FIG. 7.

FIG. 9 is a partial enlarged view in cross-section of a portion of the embodiment shown in FIG. 8.

FIG. 10 is a plan view of one end of the embodiment shown in FIG. 7.

FIG. 11 is an enlarged, right side, elevational view of a portion of what is shown in FIG. 10.

FIG. 12 is an enlarged, left side, elevational view of a portion of what is shown in FIG. 13.

FIG. 13 is a plan view of the other end of the preferred embodiment shown in FIG. 7.

DESCRIPTION OF THE PRESENT INVENTION

The present invention is particularly adapted for use, for example, in instances where a bolt having conventional threads is desired to be fastened into a material which is relatively softer and weaker. Ordinarily the tapping of threads in such a relatively softer and weaker workpiece will not provide a sufficiently firm and strong fastening means for the bolt. Accordingly, a helically coiled, wire-type screw thread insert is installed in the tapped hole to provide increased surface area which thus provides increased pullout strength and better wear properties, so that the bolt may be inserted and removed repeatedly without damaging the workpiece.

In accordance with a first embodiment of the invention, as shown in FIGS. 1-4, there is depicted a helically coiled, wire-type screw thread insert 10 which is wound having any degree of advance corresponding to the advance for a particular threaded member, i.e. a screw or bolt, with which it is designed to cooperate. Thus, for various thread sizes and for various diameters of threaded members, the insert 10 may have slightly different dimensions. Although the drawings show use of a wire having a generally diamond-shaped cross-section, it is to be understood that the invention is applicable to a wire having a cross-section of any form such as square, round, or triangular. What is important, however, is that both free end coils 12 are so formed that they provide a recess or grip means 14 for a suitable installation or removal tool.

When the insert 10 is to be installed in a tapped hole, an installation tool is first placed into the insert from either free end 12, so that a pawl or gripper portion of the tool 18 engages the recess 14 of the insert 10, which then may be threaded by means of the tool 18 into the tapped hole. In certain sizes of inserts it has been found necessary to use a special tool having a prewinder sleeve in which the insert is first placed, without regard to orientation, so that the insert can be reduced in diameter prior to being threaded into the tapped hole. A preferred installation tool is shown and described in U.S. Pat. No. 4,553,302 which issued to Cosenza et al. on Nov. 19, 1985.

In threading the insert 10 into the tapped hole, the torque applied by the tool to the recess 14 will generally cause a contraction of the free end coil 12 so that during the insertion the terminal end 16 will first enter the tapped thread in the workpiece, whereupon the free end coil 12 and the remaining coils 13 will follow. When the torque is relieved, the coils 12, 13 will expand to be firmly seated in the tapped hole of the workpiece.

A terminal end 16 of each of the free end coils 12 is illustrated in FIGS. 2-4. A truncated portion or free end, being slightly reduced along the longitudinal axis of the wire, forms the terminal end 16 at both free end coils 12. The truncated ends are preferably formed with an angle A between 10°-15° included between a line B tangent to the rear portion of the truncated end 22 and a line C formed by the outer crest 24 of the diamond-shaped wire. A lesser angle X is included between a line Y tangent to the inner circumference at the rear portion 22 of the truncated end and a line Z coextensive with the inner crest 26 of the diamond-shaped wire. The purpose of the truncated portion of the terminal end 16 of the insert is to prevent sharp edges from shaving metal during installation of the insert into a tapped hole and to provide an effective lead-in for the threads of the bolt being installed in the insert.

FIGS. 5-6 show another embodiment of the terminal end 16 of the insert 10 in which the diamond-shaped wire is rounded off in the form of a radiused-surface.

With reference to FIG. 3, there is shown a recess 14 which receives an outwardly biased pawl (not shown) from the installation tool 18 which exerts the necessary torque to thread the insert 10 into the workpiece. The recess 14 has a lead wall portion 28 generally raked between 5°-15°. This angular rake insures that the gripper or pawl of the installation tool 18 is fully inserted into the recess 14 in order to exert a torsional force so that the free end coil 12 will be contracted during insertion. In the embodiment illustrated in FIG. 3, the preferred camming surface 29 of recess 14 is kept to a minimum. In the embodiment of FIG. 5 the recess 14 has a gradual camming surface 29' generally encompassing 90° of the inner crest 26 of the insert 10.

The insert of the present invention with recessed driving means at both ends provides a helically coiled, wire-type screw thread insert which is readily adaptable for fully automatic installation operations since the insert 10 can be inserted with either free end coil being the lead thread. A preferred adaptor tool for use in such automatic installation operations is shown in U.S. Pat. No. 4,528,737 which issued to Cosenza et al. on July 16, 1985.

Finally, it will be clear that the two free end coils 12, each with a recess 14, will permit removal of the insert 10 from the workpiece by inserting a tool (not shown) into the installed insert 10. A preferred removal tool is shown in U.S. Pat. No. 4,553,303 which issued to Yamamoto on Nov. 19, 1985. The pawl of the removal tool engages the recess 14 opposite the recess used to insert the coiled insert 10. Again, the torque applied to the insert 10 by the tool in the opposite direction for insertion will cause contraction of the free end coil during removal of the insert.

Referring now to FIGS. 7-13, a preferred embodiment of the present invention will be described. Like the embodiments shown in FIGS. 1-6, the helically coiled, wire-type screw thread insert 10' has a body substantially cylindrical in shape. The plurality of coils includes a first free end coil 12A, a second free end coil 12B identical to but at an opposite end of the body from the first free end coil 12A, and any selected number of coils 13' extending between and connecting the free end coils 12A, 12B. Each free end coil 12A, 12B includes the hook means or tool gripping recess 14' as described above. Each recess 14' includes a camming surface 29" and a lead wall surface 28', and functions in the same manner as described earlier.

The embodiment shown in FIGS. 7-13 is preferred in that the means for seating the insert in the tapped hole and for preventing damage to the workpiece during installation and removal of the insert have been further developed and improved upon from what was first known and described in our earlier patent application Ser. No. 533,845.

In FIGS. 8-13 it may be seen that the two free end coils 12A, 12B have been formed so as to have an outer thread pitch diameter P1 which is less than the outer thread pitch diameter P2 of the remaining coils 13'. Further, the outer thread pitch diameter P1 of the free end coils 12A, 12B is preferably selected so as to be equal to or slightly larger than the thread pitch diameter of the workpiece tapped hole (not shown). This will enhance the thread installation of the insert into the tapped hole.

A second improvement may be best understood from a study of FIGS. 9, 11, and 12. Each free end coil 12A, 12B has a terminal end portion, 16A, 16B respectively, formed identical to each other. As can be seen such terminal end portions 16A, 16B have a cross-sectional area which diminishes as end face 30A, 30B respectively is approached. This is in contrast to the otherwise uniform, (and in this case diamond) cross-section of the remaining wire of the body. FIG. 9 shows this otherwise uniform cross-section of the body's wire. However, it should be noted that the terminal end portion 16A, 16B maintains the original cross-sectional shape, e.g. diamond, circular, etc. throughout the length of the end portions diminishing cross-sectional area. See FIGS. 11, 12. The diminishing cross-sectional construction is particularly effective when it is formed such that the respective outer thread form angle 17A, 17B of the terminal end portions 16A, 16B respectively, is equal to or less than the thread form angle of the tapped hole of the workpiece (not shown). Typically the thread form angle provided in a tapped hole is approximately sixty degrees. Further effectiveness is realized when the diminishing cross-sectional area portions 16A, 16B are formed with inner thread form angles 19A, 19B respectively, which are equal to or less than the external thread form angle of the fastener component, e.g. bolt (not shown), which is threaded into the insert 10'. This configuration for the terminal end portions 16A, 16B will provide a piloting function and prevent cross-threading and such other problems as are frequently encountered with prior art inserts when a bolt or other fastener component first enters an installed insert. This is accomplished by the present invention as a result of the terminal end portions 16A, 16B being essentially isolated from both the threads of the tapped hole and the lead-in threads of the fastener component.

As it can be appreciated from the foregoing, the embodiment of FIGS. 7-13 not only improves upon all known inserts but does so dramatically in two important areas: (1) in the installation of the insert into the pre-tapped hole in the workpiece, and (2) in the insertion of a fastener component, e.g. a bolt, into the installed insert. The specific design of this embodiment solves the binding, seizing, scraping, and insert failure problems commonly incurred when using the inserts of the prior art. Further, the invention provides a helically coiled, wire-type screw thread insert with the first known genuine thread lead-in for a fastener component, and accordingly reduces the occurence of cross-threading dramatically.

Accordingly, the scope of the invention is believed limited only by the claims which follow.

What is claimed is:

1. A helically coiled, wire-type screw thread insert adapted for installation into a workpiece having a tapped hole therein with a pre-determined thread pitch diameter, said insert comprising:
   a substantially cylindrical body of helically wound wire;
   said body having a plurality of coils including a first free end coil, a second free end coil constructed identical to said first free end coil and at an opposite end of said body from said first free end coil, and means for preventing damage to the workpiece during installation thereinto and removal therefrom;
   each of said free end coils having an outer thread pitch diameter which is less than the outer thread pitch diameter of said remaining coils extending between said free end coils, said outer thread pitch diameter of said free end coils being equal to or greater than the thread pitch diameter of the workpiece tapped hole;
   said damage preventing means including each of said free end coils having a terminal end portion, each of said terminal end portions having a diminishing cross-sectional construction along a pre-determined length thereof which construction substantially maintains the original cross-section shape of the wire, and a tool gripping recess adjacent said terminal end portion;
   said recesses being identical in construction, with one of said recesses receiving and gripping a portion of a tool during installation into the workpiece, and said other recess receiving and gripping a portion of a tool during removal from the workpiece.

2. A helically coiled, wire-type screw thread insert adapted for installation into a workpiece having a tapped hole therein with a pre-determined thread form angle and thread pitch diameter, said insert further being adapted to receive a fastener component having an external threaded portion with a pre-determined thread form angle, said insert comprising:
   a substantially cylindrical body of helically wound wire;
   said body having a plurality of coils including a first free end coil, a second free end coil formed identical to and at an opposite end of said body and at least one coil extending between and connecting said two free end coils;
   each of said free end coils having an outer thread pitch diameter which is less than the outer thread pitch diameter of said coils extending therebetween, said outer thread pitch diameter of said free end coils being equal to or greater than the thread pitch diameter of the workpiece tapped hole;
   each of said free end coils having a terminal end portion and a tool gripping means adjacent said respective terminal end portion;
   each of said terminal end portions having a diminishing cross-sectional area construction which substantially maintains the original cross-section shape of the wire, an outer thread form angle which is equal to or less than the thread form angle of the workpiece tapped hole, and an inner thread form angle which is equal to or less than the external thread form angle of the fastener component threaded into said body.

* * * * *